Aug. 20, 1935.  F. AESCHBACH  2,012,214
KNEADING AND MIXING MACHINE
Filed July 21, 1933  3 Sheets-Sheet 1

Inventor:
Friedrich Aeschbach
By Summers & Young
Attys

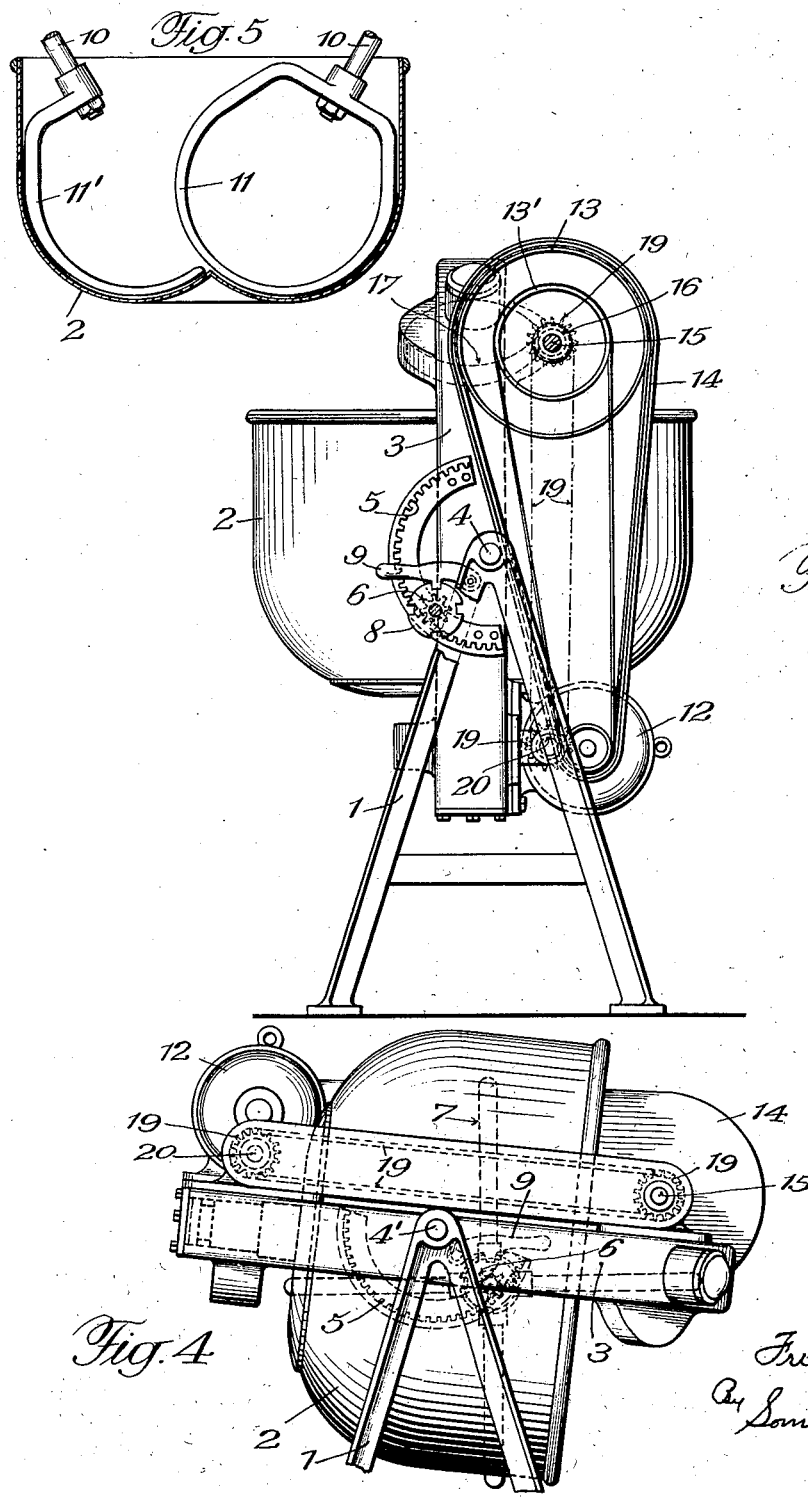

Aug. 20, 1935.  F. AESCHBACH  2,012,214

KNEADING AND MIXING MACHINE

Filed July 21, 1933   3 Sheets—Sheet 3

Inventor
Friedrich Aeschbach
By Sommers & Young
Attys.

Patented Aug. 20, 1935

2,012,214

UNITED STATES PATENT OFFICE 2,012,214

KNEADING AND MIXING MACHINE

Friedrich Aeschbach, Aarau, Switzerland

Application July 21, 1933, Serial No. 681,635
In Switzerland August 2, 1932

2 Claims. (Cl. 259—84)

This invention relates to kneading and mixing machines comprising a rotatable trough and relatively movable implements cooperating with the trough.

With machines of this type it is known to dispose one of the implement shafts in oblique relationship to the axis of rotation of the trough.

According to the present invention the kneading and mixing effect of the machine is substantially improved by providing two implements the actuating shafts of which are situated in one and the same plane through the axis of rotation of the trough and are inclined to point substantially towards the middle of the bottom of the trough, and the shape of the implements being adapted to the generatrix of the body produced in revolution forming the trough and the paths of movement caused to intersect above the axis of rotation of the trough.

Advantageously the two implements are driven at the same number of revolutions but in opposite directions.

Due to the increased efficiency this machine more quickly initiates the dough formation in the material, in consequence whereof the capability of the dough to assimilate water is substantially increased in comparison to the effect produced in the dough by the known machines.

Alternatively, the implements may be driven in opposite directions at a different number of revolutions. By this means the kneading and mixing effect of the machine is still further improved as compared with machines in which the implements are driven at an equal number of revolutions.

Figure 1:
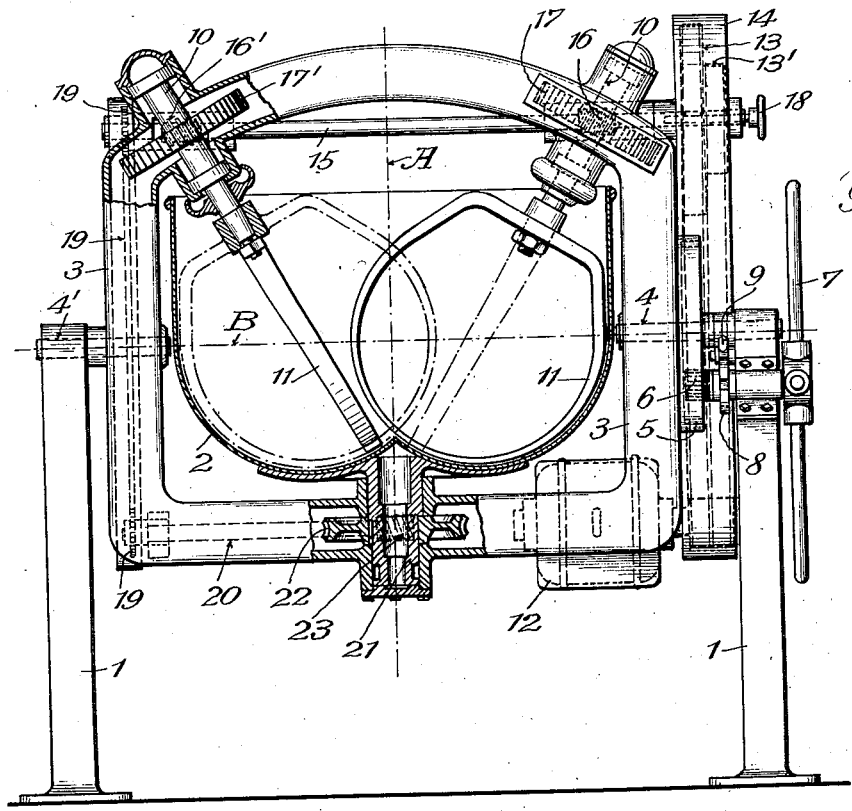
Figure 2:
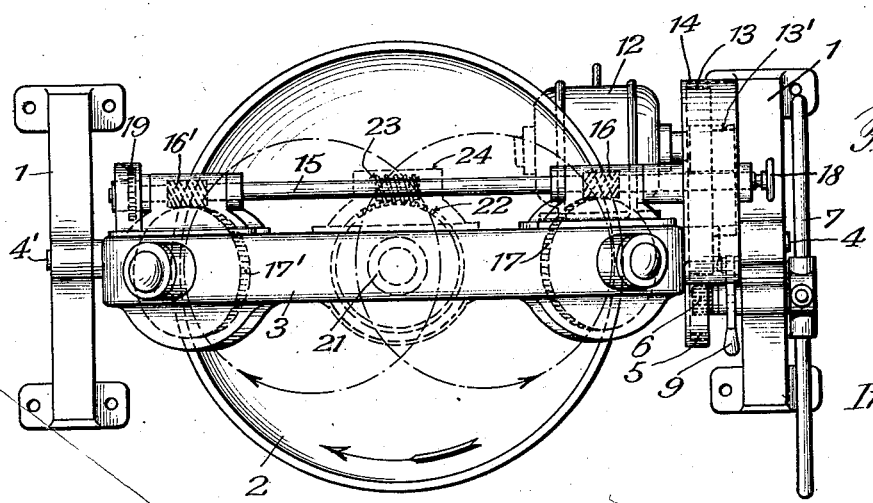

In the accompanying drawings two constructional forms of the invention are shown by way of example only, in which Fig. 1 is a front elevation partly in section of the machine, Fig. 2 shows a plan view of Fig. 1, Fig. 3 shows a side elevation of the machine, Fig. 4 is a rear view of Fig. 3 showing the trough in tilted position.

Figure 6:
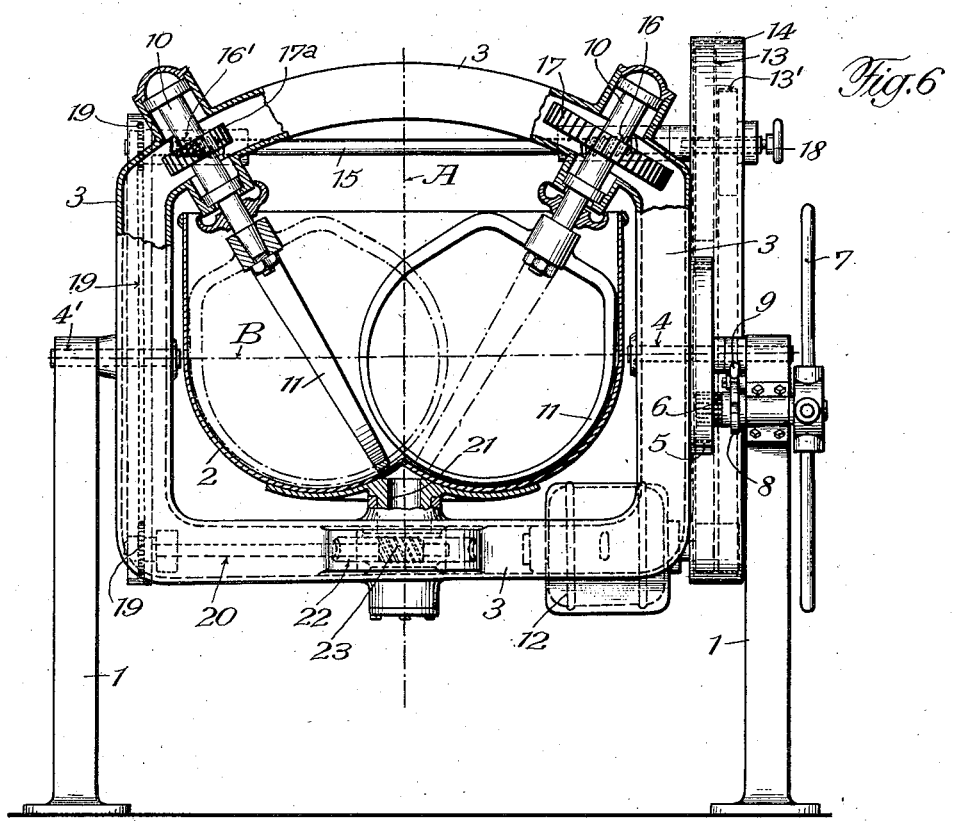
Figure 7:
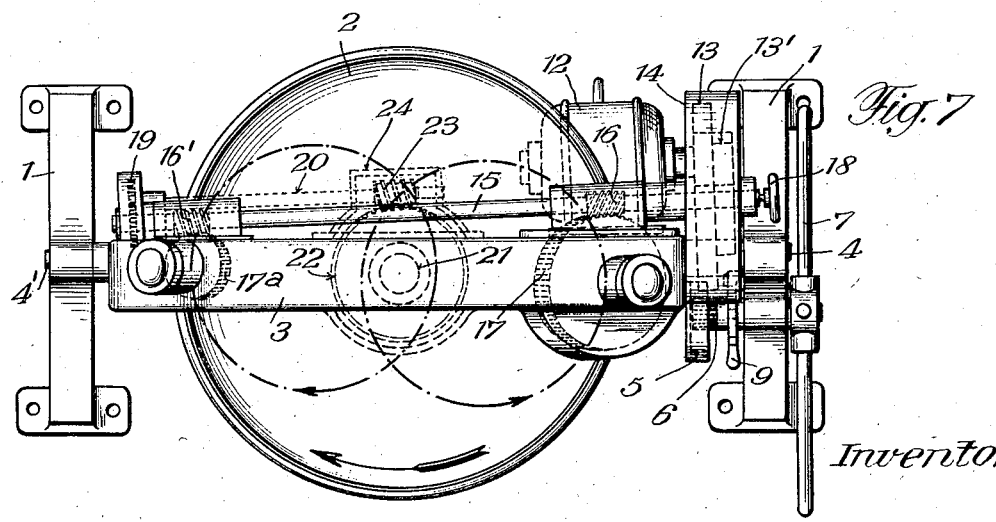

Fig. 5 illustrates a cross section of the trough with a modified form of one of the implements, and Fig. 6 shows a front elevation partly in section of a second constructional form of the invention, and Fig. 7 is a plan view of Fig. 6.

I denotes two machine standards arranged on either side of the trough 2 and adapted for carrying a hollow tiltable frame 3 in which the trough is rotatably mounted about its axis A. For this purpose the standards I are provided with upper bearing portions for receiving the journals 4, 4' of the trough which are lining up on the tilting axis B of the trough.

For effecting the tilting, on the journal 4 a toothed sector 5 is arranged which meshes with a pinion 6 on a spindle the other end of which carries a spider 7 for hand operation and which is mounted in one of the standards of the machine. A ratchet wheel 8 rigid with the spindle of the spider and cooperating with a pawl 9 permits of adjusting the trough 2 into different tilting positions, whereof the one shown in Fig. 4 permits of completely emptying the trough.

The two implement shafts 10 are arranged in symmetrically inclined relationship to the axis of rotation A of the trough and so that the implement shafts are disposed on opposite sides of the axis A in such a relative disposition that their axes extend approximately from the upper edge of the trough towards the middle of the bottom of the same. In this manner the implements 11, which are both formed in a closed ring and the outer circumference of which conforms to the portion of the interior trough wall which the implements are facing, assume a correspondingly inclined position to be adapted to operate approximately within half the working space of the trough during the rotation about their axes and the simultaneous rotation of the trough about its axis A. The paths through which the implements move intersect above in the axis of rotation of the trough.

Motion is imparted to the implement shafts 10 by an electromotor 12, secured to the lower part of the frame 3, by means of a belt drive 13, 13', which is enclosed in a casing 14, and by means of a worm shaft 15. The latter is mounted in the upper part of the frame 3 and cooperates by means of worms 16, 16' with spur gear wheels 17, 17' acting in the manner of worm wheels and carried by the respective implement shaft 10. Both implement shafts run at the same speed which is adapted to be adjusted into two stages correspondingly to the difference in diameter of the pulleys 13, 13' mounted on the worm shaft 15, by means of a shift-key controlled coupling arrangement 18, so that by connecting one or the other pulley, to the worm shaft the ratio of gearing of the belt drive is changed.

The drive of the trough 2 is derived from the end of the worm shaft 15 remote from the belt drive 13, 13', by means of a chain drive 19 acting on a worm shaft 20 mounted in the lower part of the frame 3. This shaft transmits the movement of the shaft of the motor 12 to a lower pivot pin 21 of the trough which is situated in the axis of rotation of the latter, by means of a worm drive 22, 23.

The chain drive 19, worm shaft 20, and worm wheel 23 are encased for safeguarding the persons attending the machine, by the first mentioned two parts being housed in the hollow frame 3 and the wheel 23 included in a separate casing 24.

In the operation of the machine, during the relative movements of the implements with their axes obliquely disposed to each other, a movement of the whole mass contained in the trough in the vertical direction sets in. In the beginning of the working of the material the kneading implements are run at high speed by rendering the belt drive 13' operative, whereby the dough formation in the material sets in quickly. After the dough formation is initiated the belt drive 13 is rendered operative, thus reducing the speed of the implements which owing to their inclined disposition draw out the dough in a very effective manner similar to the working of the dough by hand.

Fig. 5 shows a variant construction in which one of the implements is replaced by a semi-ringshaped implement 11' which cooperates with an annular implement 11. A further modification may consist in the arrangement of two cooperative semi-ring-shaped implements 11'. Alternatively, depending on the special purpose which the machine is to serve for working different kinds of materials, implements of still other forms may be employed.

The machine described is distinguished by a high efficiency, simplicity of design and low costs of manufacture.

The second constructional form of the invention, as shown in the Figs. 6 and 7, corresponds to the embodiment described above in all principal parts except that the two implements 11 are driven at different rotative speeds. This is accomplished by providing different diameters for the spur gear wheels 17 and 17a meshing with the worms 16 and 16' respectively. The relation between the ratios of gearing of the worm drives 16, 17 and 16', 17a cannot be chosen entirely at will. In choosing this relation the particular shape of the implements must be taken into consideration in order to avoid that the rotating implements interfere with each other.

I do not limit myself to the particular size, shape, number or arrangement of parts as shown and described, all of which may be varied without going beyond the scope of my invention as shown, described and claimed.

What I claim is:

1. In a stirring, mixing and kneading machine, in combination, a trough for the material rotatably arranged about a central vertical axis and having a dish-shaped inner wall concentrically disposed with said central axis, two individually rotatable implement shafts situated on diametrically opposite sides of said trough and directed from the edge of said trough substantially towards the middle of the bottom of the same, two implements secured to said shafts and extending at least with one arm into scraping contact with said inner trough wall and with their paths of movement intercrossing each other in the region of said trough situated about said central axis, and means for rotating said implement shafts in opposite directions in coordinated timed relationship, the upper parts of the paths of the implements being toward the center of the trough, whereby the implements tend to carry the material from the periphery of the trough into the region of the trough in which the paths of the implements cross.

2. In a stirring, mixing and kneading machine, in combination, a trough for the material rotatably arranged about a central vertical axis and having a dish-shaped inner wall concentrically disposed with said central axis, two individually rotatable implement shafts situated on diametrically opposite sides of said trough and directed from the edge of said trough substantially towards the middle of the bottom of the same, two implements secured to said shafts and extending at least with one arm into scraping contact with said inner trough wall and with their paths of movement intercrossing each other in the region of said trough situated about said central axis, and means for rotating one of said implement shafts twice as fast as the other implement shaft in the opposite direction to the latter.

FRIEDRICH AESCHBACH.